United States Patent
Ehrlich et al.

(10) Patent No.: US 8,601,315 B2
(45) Date of Patent: Dec. 3, 2013

(54) DEBUGGER RECOVERY ON EXIT FROM LOW POWER MODE

(75) Inventors: Robert Ehrlich, Round Rock, TX (US); George Baker, Austin, TX (US); Alan Carlin, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 384 days.

(21) Appl. No.: 12/917,470

(22) Filed: Nov. 1, 2010

(65) Prior Publication Data

US 2012/0110353 A1 May 3, 2012

(51) Int. Cl.
*G06F 11/00* (2006.01)

(52) U.S. Cl.
USPC ........... 714/14; 714/25; 714/45; 713/1; 713/2

(58) Field of Classification Search
USPC ................................. 714/14, 25, 45; 713/1, 2
See application file for complete search history.

(56) References Cited

U.S. PATENT DOCUMENTS

| | | | |
|---|---|---|---|
| 6,895,530 B2 * | 5/2005 | Moyer et al. | 714/25 |
| 7,500,152 B2 * | 3/2009 | Moyer et al. | 714/45 |
| 7,558,984 B2 | 7/2009 | McGowan | |
| 7,681,078 B2 | 3/2010 | Moyer | |
| 8,161,328 B1 * | 4/2012 | Wilshire | 714/34 |
| 2005/0240816 A1 | 10/2005 | Iovin et al. | |
| 2007/0214389 A1 | 9/2007 | Severson et al. | |
| 2009/0144587 A1 * | 6/2009 | Barrenscheen et al. | 714/40 |

FOREIGN PATENT DOCUMENTS

WO     2008061086 A2    5/2008

* cited by examiner

*Primary Examiner* — Charles Ehne
(74) *Attorney, Agent, or Firm* — Yudell Isidore Ng Russell PLLC

(57) ABSTRACT

A device is configured with components to enable debugging of the device's entry into and exit from a low power mode. The device includes: core logic, debug components, and a power management module (PMM). When the device exits a low power mode in which the states of the debug components are lost, the PMM prevents the core logic from resuming processing operations until the debug components have been re-configured to their prior states. The PMM either holds the core logic in reset or alternatively withholds power to the core logic. Reconfiguration of the debug components is initiated by a connected debugger, which can set one or more control and status (CS) register values within the device. The CS register values determine when the PMM prevents the core logic processing from resuming and when the PMM enables core logic processing to resume following the device's return from low power mode.

25 Claims, 8 Drawing Sheets

| | EHRE 352 | EHRR 354 | VLLS 356 | LLS 358 | DC |
|---|---|---|---|---|---|
| 150 | 1 | 0 | | | |

FIG. 3A

| EHRE 352 | EHRR 354 | VLLS 356 | LLS 358 |
|---|---|---|---|
| | | | |

FIG. 3E

| | | | | |
|---|---|---|---|---|
| 150 | 1 352 | 0 354 | 0 356 | 1 358 |

FIG. 3B

| | | | | |
|---|---|---|---|---|
| 150 | 0 352 | 0 354 | 1 356 | 0 358 |

FIG. 3C

| | | | | |
|---|---|---|---|---|
| 150 | 1/0 352 | 1 354 | 1 356 | 0 358 |

FIG. 3D

| 1/0 352 | 1 354 | 1 356 | 0 358 |
|---|---|---|---|

FIG. 3F

DEBUGGER RECOVERY ON EXIT FROM LOW POWER MODE

BACKGROUND

1. Technical Field

The embodiments described herein generally relates to debugging systems and processes and in particular to debugging of devices that can operate in different power modes. More particularly, the embodiments presented herein relate to debugging of devices when the device exits a low power mode.

2. Description of the Related Art

Most electronic devices are designed to enter into a low power mode under one or more conditions. These entries into a low power mode can be triggered by the device's processing core(s), which cause the device's power management module (PMM) to remove and/or reduce power allocated to the processing cores and to other functional components and/or sub-devices. When power is removed from most of these devices, all states maintained by those devices before the power is removed can be lost. When the device is later powered back on or exits from the low power state, the processing cores and other components resume operation without the benefit of the states that existed prior to entry into the low power mode.

During standard debugging operations on these devices (which are externally connected to the machine on which the debug process executes), entry by the device into the low power state can cause a resulting failure (crash) in the debug session. Alternatively, when the debugger is robust enough to pause its debug process (i.e., not crash due to the communication disconnect/failure with the device) and resume debug operations on the device when debugger detects that the device has returned from the low power state, important debug information is lost during the delay time from which the processor cores resume execution on the device and the debugger receives a signal indicating the device has returned from the low power mode. Further, there is no mechanism that enables the debugger to account for and/or debug the device's entry into and subsequent exit from the low power mode.

BRIEF DESCRIPTION OF THE DRAWINGS

The described embodiments will best be understood by reference to the following detailed description of an illustrative embodiment when read in conjunction with the accompanying drawings, wherein:

FIGS. 3A-3D are illustrations of an example CS register having multiple entries utilized for enabling debug operations to be performed on return from a low power mode, as provided with one or more embodiments;

FIGS. 3E and 3F provide illustrations of an example set of individual control and status registers performing the functions of the individual entries of the CS register, in accordance with one embodiment;

DETAILED DESCRIPTION

Figure 1:
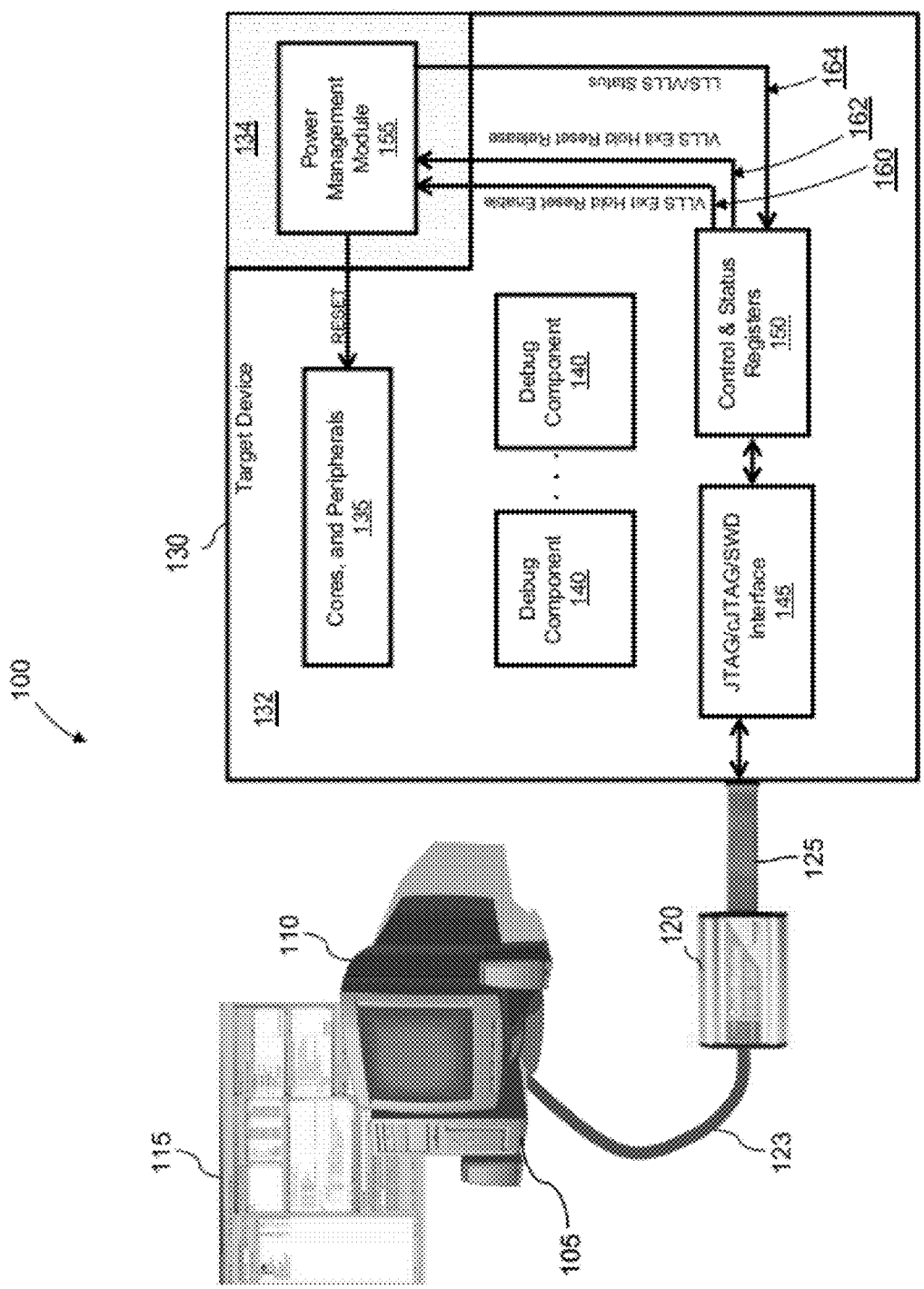
FIG. 1 illustrates an example debug system in which debugging of a target device on exit from a low power mode is supported, according to one embodiment.

The illustrative embodiments provide a method and device that enables a software debugger executing on a data processing system connected to a target device to recover and regain control of a debug session when the target device enters into a low power mode and subsequently exits from the low power mode and resumes processing. In one embodiment, a device is configured with components to enable debugging of the device's entry into and exit from a low power mode. The device includes: core logic which performs functional operations of the device; debug components that facilitate debugging operations of the device; and a power management module (PMM). The PMM includes logic that, when the device returns from a low power mode in which the states of the debug components are lost prevents the core logic from resuming processing operations until the debug components have been re-configured to their prior states. The PMM either holds the core logic in reset or alternatively withholds power to the core logic if granular power assignment is supported on the device. The reconfiguration of the debug components is initiated by a connected debugger, which can set one or more control and status (CS) register values within the device. The CS register values then control when the PMM prevents the core logic processing from resuming and when the PMM enables resumption of the core logic processing following the device's return from low power mode.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

As utilized and referenced herein, low power mode refers to a state of the device in which power to most of the functional components of the device, with the exception of the PMM has been turned off or removed. Two or more types of low power modes are recognized by the embodiments and are referred to herein as a first type low power mode (corresponding to VLLS in the described embodiments) and a second type low power mode (corresponding to LLS in the described embodiments). During the first type low power mode, each debug component, processor core, hardware registers, and other non-PMM components lose power and lose all data and state information. During the second type low power mode however, the core and other components retain their respective states and are able to resume processing at the point at which the device entered into the second type low power mode. The PMM controls the entry and exit of the device into the low power mode and the PMM retains its functional state while the system enters and exits low power modes. More specifically, in at least one alternate embodiment, the PMM is able to granularly assign power to a first set of components, such as the non-core components, while withholding power to a second different set of components, such as the core logic. In yet another embodiment, multiple PMMs can be provided within the single device, with each PMM managing power for different sets of components of the single device.

Further, as described herein, the PMM controls when the core logic can resume processing following a return from low power mode via an assertion of reset and a subsequent negation or release of the reset. The reset defines a signal transmitted from the PMM to the core logic and which is received by the core logic. When the PMM asserts the reset signal (e.g., on a reset signal line to the core logic), the cores are placed in (or enter into) a reset state prior to the devices entry into the low power mode, so that the core logic returns to the reset state when the device exits the low power mode and power is initially applied to the core logic. The reset signal prevents the core logic from performing any processing/execution of operations (e.g., performing a vector fetch) while the reset signal is being asserted by the PMM. The removal of the reset signal is also controlled by the PMM and is referred to as a negation (or release) of reset, which enables the core logic to resume/begin processing.

Within the descriptions of the figures, similar elements are provided similar names and reference numerals as those of the previous figure(s). Where a later figure utilizes the element in a different context or with different functionality, the element can be provided a different leading numeral representative of the figure number. The specific numerals assigned to the elements are provided solely to aid in the description and not meant to imply any limitations (structural or functional or otherwise) on the described embodiment.

As further described below, implementation of the functional features of the invention is provided within processing devices/structures and involves use of a combination of hardware, firmware, as well as several software-level constructs (e.g., program code). The presented figures illustrate both hardware components and software components within example data processing architecture with a single processor/processing node illustrated within a single, network-connected, data processing system. The illustrative and described embodiments assume that the system architecture may be scaled to a much larger number of processing nodes, as with a multiprocessor system and/or with a distributed computing system.

With reference now to the figures, and beginning with FIG. 1, there is depicted a system for debugging a target device, while enabling the debugger (application/utility) to recover from entry of the target device into a low power mode and to continue the debug session of the target device on exit of the device from the low power mode. As illustrated, the system 100 generally comprises a data processing system 105 coupled to a target device 130 via a debug connector interface/mechanism/port 120 that enables translation and communication of debug session information with the target device 130. Each primary component is composed of a plurality of sub-components, some of which are also illustrated.

Figure 2A:
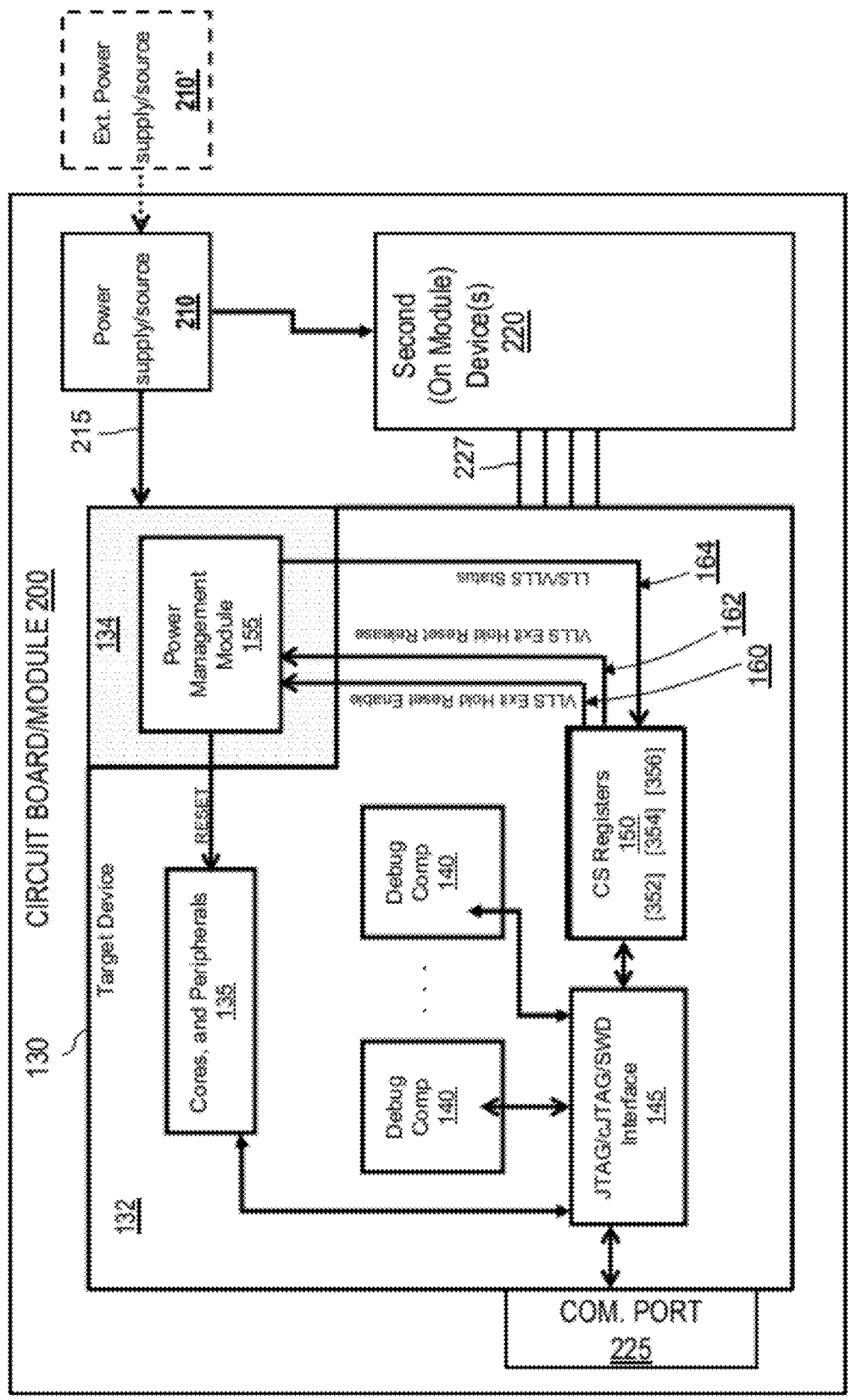
FIG. 2A is a block diagram of various components of a target device with a low power mode (LPM) control and status (CS) register, according to one or more embodiments.
Figure 2B:
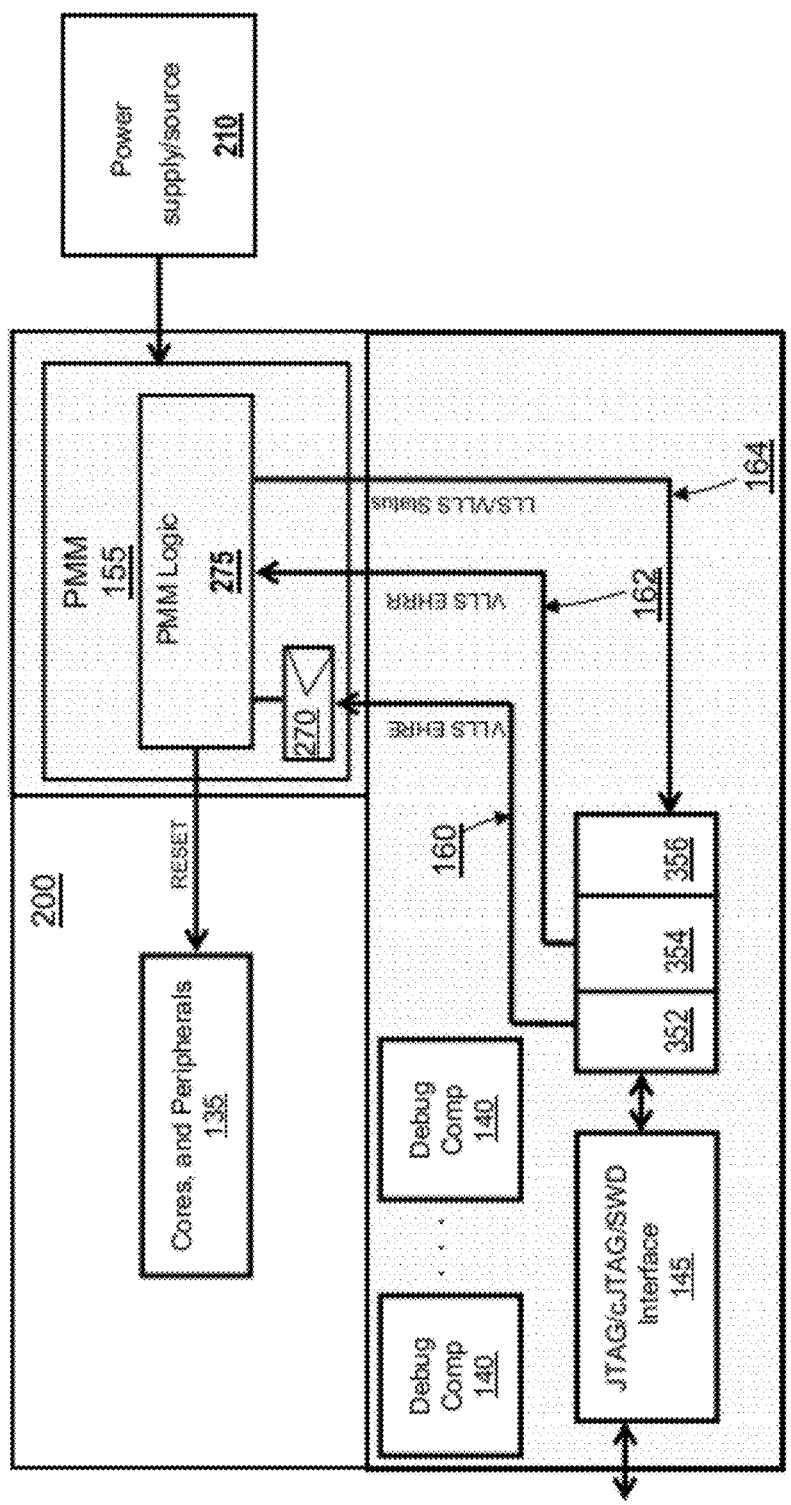
FIG. 2B is a block diagram of the target device of FIG. 2A with a power management module (PMM) latch provided along with the LPM CS register to control resumption of core functions and debug operations on exit of the device from low power mode, according to one or more embodiments.

As illustrated within FIG. 1 and also presented by FIGS. 2A-2B, target device 130 comprises a plurality of components, including a first set of components that process operations of the target device and a second set of components that record debug data and/or facilitates debugging during operation of the target device. Specifically, target device 130 includes processing devices and associated peripherals, which are presented as cores and peripherals 135, and which control and/or provide the basic functional operations of the target device 130. Within the description, these components are also referred to as core logic, which complete processing operations on the target device 130. Target device 130 also includes a plurality of debug components 140, in which debug data and/or state information are stored as the target device is taken through a debug session/operation. Also illustrated within target device 130 is a power management module (PMM) 155, which controls the allocation of power to the plurality of components within the target device 130. Target device 130 further comprises a communication interface 145, which is indicated as one of a JTAG, cJTAG, or SWD interface. Communication interface 145 enables target device to exchange communications with an external device (e.g., data processing system 105) or processing module (e.g., debugger) via a debug connector interface/mechanism 120, as shown. According to the embodiments presented herein, target device 130 also comprises one or more control and status (CS) registers 150, which is/are hardware registers that is/are built or embedded on the target device 130.

Figure 2C:
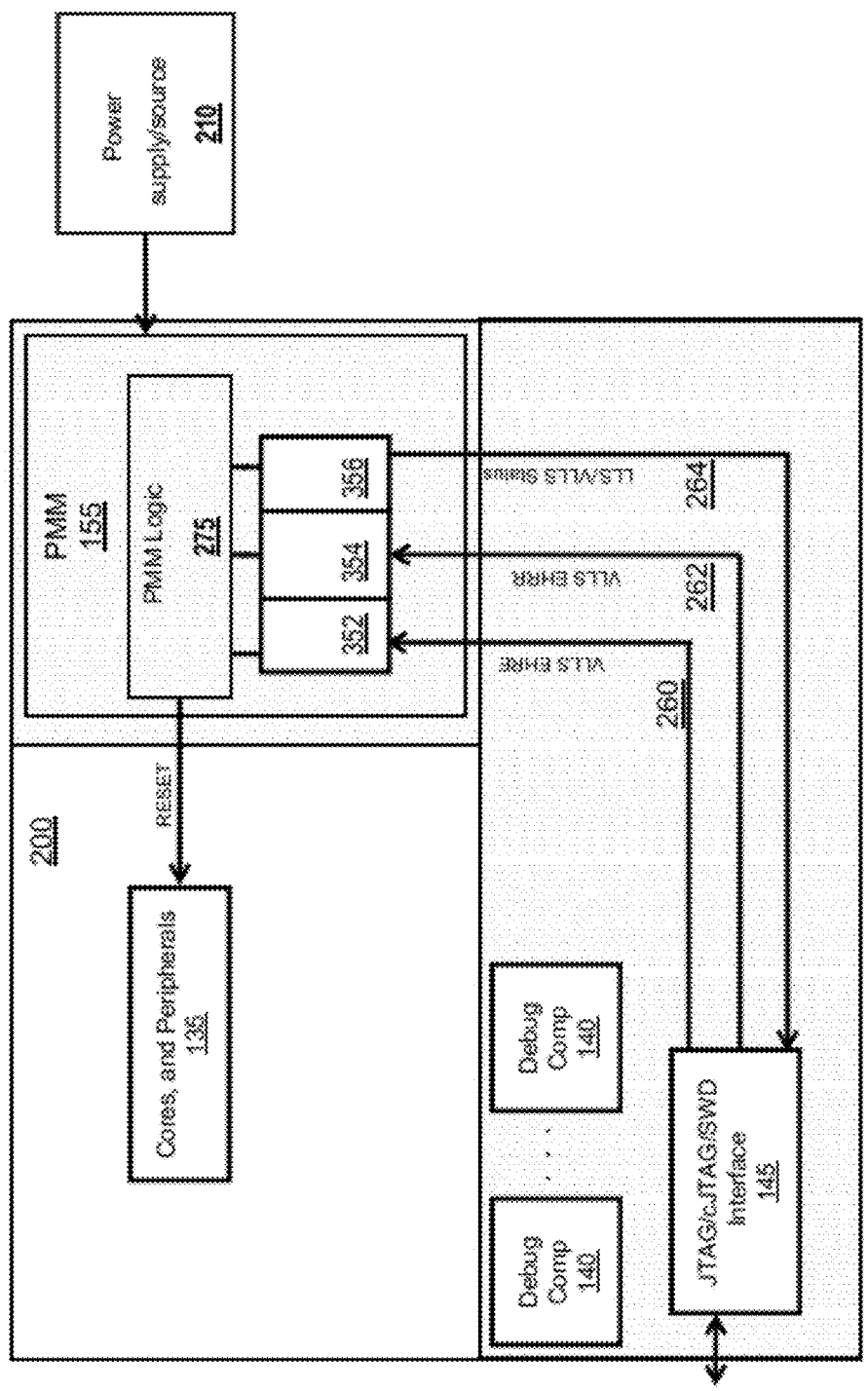
FIG. 2C is a block diagram of an embodiment in which the CS registers of the target device are physically located within the PMM, according to one or more embodiments.

As illustrated by FIG. 3A, CS register(s) 150 have a plurality of register entries, in which can be stored corresponding entry values. In the described embodiments, each entry is presented as a single bit entry, with possible entry values of 1 (or logic high) and 0 (or logic low). It is appreciated that other embodiments may provide for each entry of CS register 150 to have more than a single bit and associated entry values that are larger than binary 1 or 0. Particularly, and as described with reference to FIGS. 3E and 3F below, in an alternate embodiment CS register 150 may comprises a plurality of independent registers and each "entry" described herein may be a separate register holding a unique value that may be one or more bits. Only four separate registers (or register entries) are utilized within the presented embodiments; However, it is appreciated that CS register 150 and/or the plurality of independent registers may comprise additional entries that can be utilized for other purposes during the current or a different debug session. In the implementation illustrated by FIGS. 1 and 2A-2B, each entry of CS register 150 (or each individual CS register, in the alternate embodiment) is connected to a signal line connected to PMM logic within PMM 155. A first two signal lines provide an indication of the value stored in the first entry and the second entry of CS register 150, respectively. During debug operations and on return from low power mode, one or both of these signal lines are asserted (with logic high) by input received on communication interface 145 from debugger (in DPS 105). Assertion of the signal lines occurs when the value within the entry is set to 1 (versus the default setting of zero (0)). In an alternate embodiment in which the CS register(s) are located within the PMM 155, as illustrated by FIG. 2C, is appreciated that the signal lines are utilize to communicate values between communication interface 145 and PMM 155, rather than exchange entry values between the CS registers 150 and PMM 155.

As presented by FIG. 3A, a first entry (value) of CS register 150 indicates whether a debug session is to be continued/resumed in response to the target device exiting a first type low power mode (i.e., VLLS). The second entry (value) indicates when the PMM is triggered to negate or release a reset (or to apply power to) the first set of components (cores and peripherals 135) following a return of the target device from the lower power mode. In the described embodiments, the values of both the first and second entries are set by (receipt of signals from) the debugger, and both entries can be reset by the debugger as well. In the embodiments in which the CS registers are external to the PMM, the values are automatically reset when the device next enters into a low power mode. However, in the embodiment in which the CS register(s) are a part of (or embedded within) PMM 155, the second entry is reset either by receipt of a signal from the debugger or by PMM logic following resumption of processing operations by the first set of components.

The third signal line is set by the PMM 155 and provides an indication from the PMM logic of whether the power event (entry into low power mode) was of the type that removed/reset the data and/or state of the debug components. This value also indicates whether the debugger has to perform any download of information to the debug components before debugging can be resumed from the point immediately following when the device entered into the low power mode. Thus, the third entry (value) indicates a characteristic of the low power mode that determines whether the low power mode was such that an exit from the low power mode requires the second entry value to be set before power is applied to the first set of components following the return of the target device from the low power mode. A fourth entry (value) can be provided to indicate when the device entered into a low power mode that is a second type low power mode. As described herein, the second type low power mode (LLS) is a mode in which the state is retained within the various logic and core components such that a re-configuration of the debug components is not required when the device exits from the second type low power mode (unlike with the first type low power mode).

Returning now to FIG. 1, as further provided, the interface mechanism comprises a communication converter module/port, which is generally referred to as debug communication interface 120 or simply a debug interface 120. Debug interface 120 is respectively coupled between the DPS 105 (debugger) and the target device 130 via an input output (I/O) connector 123 and a serial cable 125. Any one of a number of different types of debug interfaces 120 can be provided in the various embodiments. However, in one embodiment, as presented in FIG. 4, which is described below, debug interface 120 includes functionality associated with an LPM utility, in addition to the standard protocol conversion logic/utility that would be found within debug interface 120.

Data processing device 105 is illustrated having a display device 110 associated therewith. Presented on display 110 is an example debug graphical user interface (GUI) 115, which is generated by the debugger executing on DPS 105. Generally, DPS 105 comprises a processor, a memory, and debugger code executing on the processor, and DPS 105 provides the debugger, which generates specific test conditions for forwarding to the target device. Functional components of the example data processing device 105 of FIG. 1 are presented in greater detail in the description of FIG. 4 herein.

Additional configuration and functionality of the target device 130 is illustrated by FIGS. 2A and 2B, which respectively provide a power state depicting entry into a low power mode and a power state depicting exit from the low power mode state. In FIG. 2A, the device 130 is illustrated as one device on a circuit board or module 200. In addition to device 130, circuit board 200 includes thereon one or more second devices 220, and a communication port 225 by which the device 130 connects to components off the circuit board 200. Second devices 220 may communicate with device 130 via one or more on-board interconnects 227. Each of the devices on circuit board 200 receives power from a power supply/source 210. As provided, power supply/source 210 can be located on the circuit board or can be an external power supply/source 210' located off the circuit board.

As generally provided by the described embodiments, the target device 130 is specifically configured within functional hardware and software/logic to enable debugging of a return of the device from a low power mode. The target device 130 comprises: a first set of components that process instructions and performs functional operations of the device; one or more control and status (CS) register(s) having a plurality of entries utilized to enable debugging of a return of the device from a low power mode; a communication interface that enables communication by an external debugger with the device and which is coupled to the CS register to enable setting of one or more entries of the CS register by the external debugger; and a power management module (PMM) having logic that enables the PMM to initially prevent the first set of components from resuming processing operations on return from low power mode and then to enable the first set of components to resume processing operations once the one or more CS register(s) have been reconfigured to their proper state. In one embodiment, in which the CS register is external to PMM, the device includes a plurality of signal lines coupled between the PMM and respective entries of the CS register. Also, when the mechanism for preventing the core logic from completing processing operations involves holding the core logic in reset, the PMM includes a reset signal lead coupled to one or more of the first set of components. The PMM also has a power supply connection for receiving power for powering the device.

FIG. 2B illustrates latch 270 and PMM logic 275 within PMM 155, according to one embodiment. As shown, latch 270 is coupled to and receives a latched value from the VLLS EHRE control register (or first entry of CS register) 352. The value of the EHRE register/entry/bit 352 is latched in response to the PMM detecting that the device is about to enter low power mode. In the alternate embodiment, which is illustrated by FIG. 2C, the one or more CS registers 150 are located within PMM 155, and there is therefore no need to latch the EHRE value as that value would be contained within the PMM, which is always powered. In this alternate embodiment, one implementation may allow for a reset of the value of the EHRE register/entry/bit once the PMM asserts a reset to the core logic. However, because the debugger would likely want to continue to monitor for issues that may be related to later exit from low power mode, the EHRE bit is left set until the debugger no longer needs to debug a return from low power mode condition of the device. Because FIG. 2C contains similarly configured components as FIGS. 2A and 2B, with the primary exception of the CS register(s) being within the PMM, no specific additional description of FIG. 2C is provided herein. However, it is appreciated that with this embodiment, no separate latch is required, as the registers or entries therewith maintain their states/settings during a low power mode, as the CS register(s) are located in the PMM domain, which is always powered on (unless the device is completely powered off). The EHRE and EHRR set inputs (260, 262) are received directly into the respective register entry or register from the device's debug interface 145, and the VLLS (and LLS) values are read directly from the respective register entries/registers within the PMM 155.

PMM logic 275 is the control logic that controls applying and removing power to one or more of the components of the device. Specifically, within the described embodiments, PMM logic 275 provides additional enhanced functionality. According to one aspect, the PMM logic 275 performs the functions of: in response to detecting an entry of the device into a low power mode, automatically latching into a first latch 270 (FIG. 2B) of the PMM a current value of a first entry of the CS register; in response to receiving an input to initiate a return of the device from the low power mode to an operating mode: checking a latched value saved within the first latch; and in response to the latched value being a first value: withholding an negation or release negation or release of a reset signal to the first set of components. The negation or release of the reset signal is required to enable the first set of components to enter into an operational state. The PMM logic further performs the functions of: detecting a current value of the second entry of the CS register via a second signal lead coupled between the PMM and a second entry of the CS register; and responsive to the current value associated with the second entry being a release value, negating or releasing the reset signal on the reset signal lead.

In the illustrative embodiments, the device 130 consists of at least two different power domains, a first domain 132 which is always powered on and a second domain 134 that can be in a power on state or selectively powered down to enter into a low power mode. The shading provided within FIG. 2A is intended to indicate a differentiation between the first domain 132 (shaded portion) and the second domain 134 (un-shaded portion), while the shading provided within FIG. 2B identifies which sections of the device (and corresponding components) are power on and fully functional following the exit from low power mode in which the latch 270 of the PMM 155 contains a latch value that triggers a hold on reset response of the PMM logic 275. Specifically, FIG. 2B illustrates the embodiment in which the PMM can selectively apply power to the core logic separate and independent from applying power to the other components of the device, including the debug components. As shown, each other sector of the device has been shaded indicating that PMM has applied power to those areas of the device in which the debug components are located. With this device configuration, the PMM is able to return power to all other components except the core logic until the PMM receives a EHRR value that allows PMM to negate the reset of the core logic or applying operational power to the core logic. It is appreciated that this particular embodiment is not one that would be utilized for a device in which one or more debug components are placed within the core logic such that these components have to be powered on (and are powered on with the core logic) in order to be updated/re-configured by the debugger following a low power mode event. The PMM logic is implemented within the always powered-on domain of the device. When the device enters a low power mode, the PMM logic latches the value set within a first entry of the CS register or the first control register, VLLS Exit Hold Reset Enable register. When the device later wakes up, or exits from the low power mode, and if the VLLS Exit Hold Reset Enable was set on entry into the low power mode, the PMM logic continues to hold the core (processing components) in reset until the PMM Logic receives a signal from the debugger to release the reset. This debugger controllable delay in the time to enable the reset of the core components provides the debugger with time to re-configure the debug components, which are not held in reset.

According to the embodiments, the PMM logic further performs the functions of: in response to receiving a low power mode entry request and prior to removing power from the first set of components, latching the current value of first entry of the CS register; in response to the latched value being a second value: negating or releasing the reset signal on the reset signal line on return from the low power mode; and providing power to the first set of components. Also, the PMM logic performs the functions of: in response to the current value within the second CS entry being a hold value, delaying a negation or release of the reset signal until the current value changes to the release value.

As described, the device includes one or more debug components that record debug data and state information of the device during processing by one or more of the first set of components. The second entry of CS register contains a hold value following a return of the device from the low power mode, the device receives from the external debugger information to restore the one or more debugs to a desired state that existed prior to entry of the device into the low power mode. Then, the PMM logic performs the functions of: determining when a low power mode from which the device is exiting is a first type low power state that requires a restore of one or more debugs to enable seamless resumption of debugging to capture the exit from the low power state; and in response to the low power mode being the first type low power mode, automatically setting a value of a third entry of the CS register to indicate that the low power mode was a first type low power mode to trigger a hold on reset process of the device. The hold on reset process enables the external debugger to first restore the one or more debugs to the desired state before the reset signal is negated/released by the PMM.

In one embodiment, the PMM further comprises a power assignment mechanism that enables a granular assignment of power to different components of the device. Power is applied to the first set of components following a return from low power mode, independent of an application of power to a second set of components and the CS register.

Aspects of the described embodiments enables a software debugger to gracefully recover and regain control of a debug session when a device has entered a low power mode, where communication with the device has been disconnected or the entry into low power mode is otherwise communicated to the debugger, and the device's debug components have lost power and thus lost their respective states. In one embodiment PMM logic and control and status registers are provided outside of the core and are utilized to recognize low-power mode exit and signal such low power mode exit to the debugger, and to hold the core in a quiescent state until the debugger has reconnected and explicitly released the core to continue processing (e.g., perform vector fetch operations). In one embodiment, a second type low power mode is defined in which the debug components and core do not lose their states and are thus able to seamlessly continue/resume processing/operating (from the point at which processing was suspended on entry into the second type low power mode) following a return from the second type low power mode. The PMM logic differentiates among the two (or more) types of low power mode and set the appropriate bit/bits within the control and status registers.

The handshake mechanism consists of a debugger accessible control and status (CS) register. In the illustrative embodiment, the CS register is accessible via one or more connectors from among JTAG, 2-pin cJTAG, or 2-pin Serial Wire Debug or any number of other connectors and protocols, such as Aurora or DigRF. When the debugger initiates a debug session of the device, the debugger can configure the low power mode handshake mechanism (PMM via entries to the CS register) to hold the core (first set of components) in reset after the low power mode has been exited and until a release of the reset is triggered by the debugger.

Status bits allow the debugger to detect that the device just exited from one of the low power modes. Another control signal allows the debugger to release the core reset and continue the debug session once it has finished reconfiguring the debug components.

Referring specifically now to FIGS. 3A-3D, there are illustrated three representation of an example CS register 150. As presented by FIG. 3A, CS register 150 comprises a number of entries, which for purposes of discussion are assumed to be single bit entries. Each entry is allocated to track a specific variable related to the low power mode entry and exit of the device. Thus a first entry 352 holds an exit hold reset enable (EHRE) value and can be interchangeably referred to herein as the EHRE entry or EHRE bit. The second entry 355 holds an exit hold reset release (EHRR) value and can be interchangeably referred to herein as the EHRR entry of EHRR bit. Each of the EHRE entry/bit and the EHRR entry/bit can have a null or zero (0) value when not set or a logic 1 value when set. Both the first and second entries of CS register are set by receipt of a signal transmitted from the debugger 430 executing on DPS 105.

The third entry of CS register 150 holds the value that indicates the type of low power mode that the device is returning from. In the illustrative embodiments, two different entries 356 and 358 are provided to enable tacking of multiple different types of low power mode. However, for simplicity in the descriptions herein, a single VLLS entry/bit 356 is referenced for tracking whether or not a single first type of low power mode has been detected. Thus, for example, the first type of low power mode represents the very low power mode in which power is removed to a level at which the states and data of various functional components (particularly the debug components) within the device are lost and are not restored on return of the device from the low power mode. Thus, the VLLS entry/bit simply indicates (to the debugger) when the debugger has to perform a restore of the states and data of the debug components in order to properly recover from the device's entry into and exit from the low power mode. The VLLS entry/bit has a null or zero value (0) as a default value, and the VLLS entry/bit is set to a logic high (1) value by the PMM logic when the device exits/returns from the first type of low power mode.

In one implementation, the fourth entry of CS register 150 is utilized to hold the value of a second type of low power mode, which is referred to herein as the LLS mode. The corresponding LLS entry/bit/register 358 indicates to the debugger when the debugger does not have to restore the states of the debug components of the device. The LLS mode is a low power mode in which the device can lose communication with the debugger; However, when the device is in the LLS mode, the debug components retains their respective states, such that the debugger would not have to re-configure the debug components on return of the device from the LLS mode. The PMM logic 155 sets the LLS bit/entry 358 when the device returns from the LLS mode, and the value within the LLS bit/entry 358 is communicated to the debugger, which is programmed to treat a LLS bit value of 1 (versus zero (0)) as being a return from a low power mode that does not require the debugger to perform and reconfiguration of the debug and to simply resume debugging operations (if such operations were suspended). CS register(s) 150 can also comprise additional entries that are utilized for other functions of debugger, and these entries are considered don't cares (DC) for purposes of the presented embodiments.

In one embodiment, rather than provide individual entries of a single CS register, the functionality described herein as entries within the CS register are implemented via separate, individual registers. Thus, the structure illustrated as CS register 150 within FIGS. 1, 2A and 2B and FIG. 3A-3D are designed as individual registers. FIGS. 3E and 3F illustrates this alternate embodiment. In one configuration, each of the separate registers has a separate signal connection to/from communication interface 145. As provided by FIG. 3A, first control register 352 is a single bit register that holds the VLLS Exit Hold Reset Enable value. As described herein, the value of the bit within first control register 353 enables the power management system (i.e., the PMM) on the device to hold the reset on exit from VLLS mode. Second control register 354 is also a single bit register which holds the VLLS Exit Hold Reset Release value. The ability to set the value of the second control register 354 allows the debugger to release reset on exit from very low leakage power mode exit when the debugger is ready to release the reset (e.g., after all the debug has been reconfigured). Finally, a status register 356, comprising two bits, that holds a settable value that indicates the VLLS and LLS mode status, which respectively indicate that the device was in one of very low leakage stop (VLLS) or low leakage stop (LLS) modes. As explained above, a single bit implementation allows for tracking of only the VLLS mode and is utilized in the described embodiments.

Referring to FIG. 3B, there is illustrated an example set of values within the first entry 352, second entry 354 and third entry 356 of the CS register 150 prior to the device first entering into a low power mode. As shown, first entry 352 has a first value which is a logic high (or 1), indicating that the debugger has set the first entry value to allow for recovery of the debug session if the device enters into a low power mode. As described herein, the debugger transmits the signal via the interface mechanism that is received at the communication interface of the device and which sets the value of the first entry. FIG. 3C then illustrates the state of the entries following an entry and an exit from a first type low power mode. During the low power mode, the CS register values are all zeroed due to the loss of power to the portion of the device 130 in which the CS register 150 exists. On return/exit from the low power mode, the PMM logic 275 sets the third entry 356 of CS register 150 to logic high (1) to indicate the first type low power mode. FIG. 3D illustrates the entry values of CS register 150 following receipt at the device's communication interface of a transmission from debugger 430 containing a second (release) signal to set the second entry of CS register to a logic high (1). As described herein, this transmission is provided over the interface mechanism following a completion of the restoration of desired state and data of the debug components. First entry 352 may be either a logic high (1) or null value (0) depending on whether debugger 430 has transmitted a next first signal to set the value of first entry of CS register 150.

Figure 4:
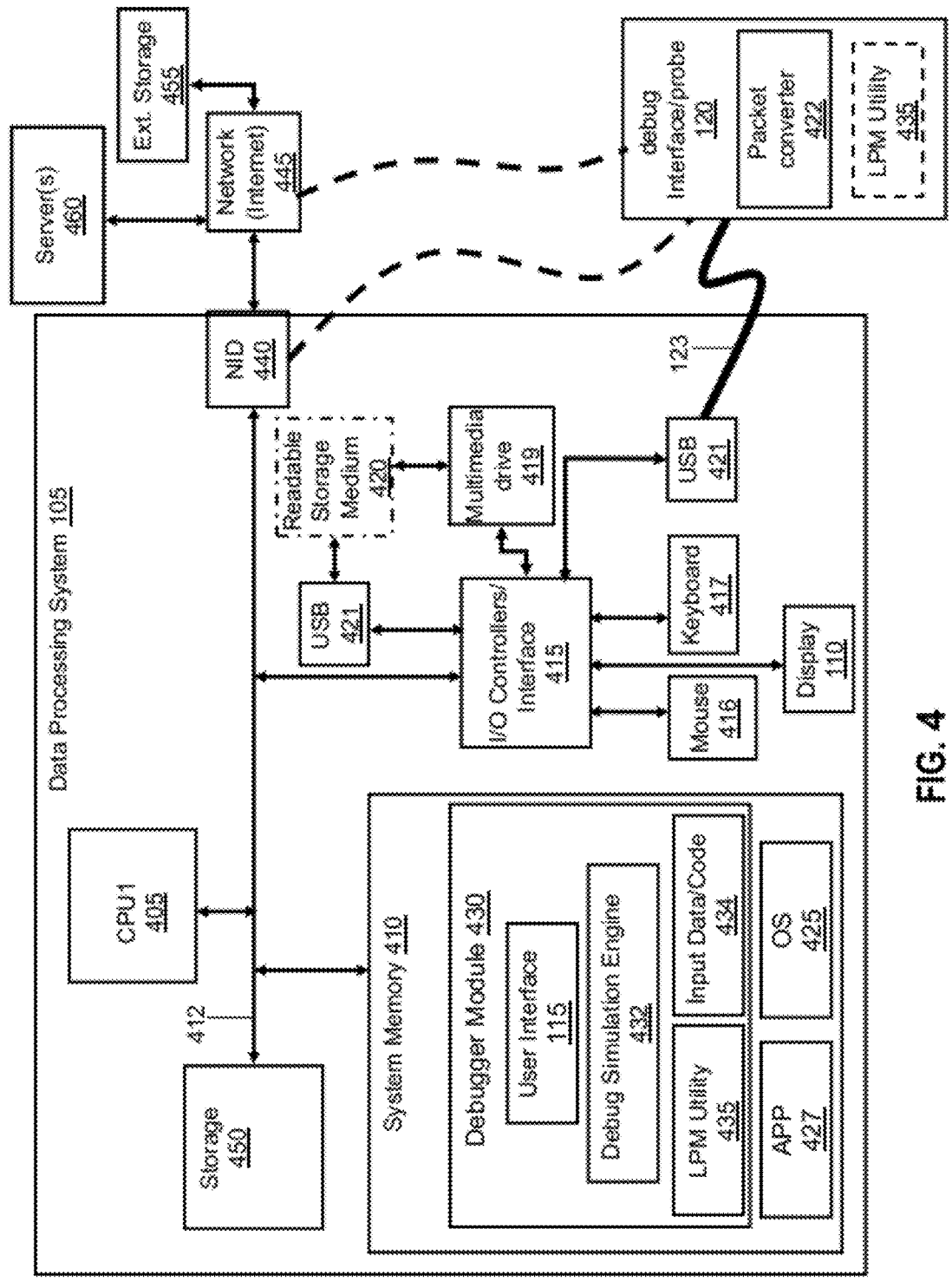
FIG. 4 is a block diagram of a data processing system executing debug code adapted for completing debugging of a target device, including debugging on return from low power mode.

FIG. 4 illustrates a block diagram representation of an example data processing system (DPS), adapted with software modules that enable completion of one or more of the methods described herein, in accordance with one or more embodiments. DPS 105 may be a server, a personal computer, a portable device, and/or other types of electronic devices that may generally be considered data processing devices and which are capable of executing a debugger application/utility. As illustrated, DPS 105 comprises one or more processors (or central processing unit (CPU)) 405 connected to system memory 410 via system interconnect/bus 412. Also connected to system bus 412 are one or more Input/output (I/O) controllers/interfaces 415, which provide connectivity and control for input devices, of which a pointing device (or mouse) 416 and keyboard 417 are illustrated. I/O controllers/interfaces 115 can also provide connectivity and control for output devices, of which display (monitor) 110 is illustrated. Additionally, a multimedia drive 119 (e.g., compact disk read/write (CDRW) or digital video disk (DVD) drive) and USB (universal serial bus) port 120 can be coupled to respective I/O controllers/interfaces 115. Multimedia drive 119 or USB port 121 or other serial port enable insertion/connection of one or more readable storage mediums 120 (e.g., optical disk or thumb drive) on which data and/or program instructions/code may be stored (or embedded) and/or from which data and/or program instructions/code may be retrieved. DPS 100 also comprises non-volatile system storage 150 coupled via a corresponding storage adapter (not shown). System storage 150 may store data and/or program instructions/code, including data specific to the implementation of the debug operations of one or more target devices.

To enable communication with external networked components, DPS 102 further comprises one or more network interface device(s) 440, by which DPS 105 can connect to one or more network accessible devices, such as external storage 455 or server(s) 460. Access to these devices is enabled via one or more networks 445. Network interface 440 may be configured to operate via wired and/or wireless connection to an access point of the network 445. Network 445 may be an external network such as the Internet or wide area network (WAN), or an internal network such as an Ethernet (local area network—LAN) or a Virtual Private Network (VPN). When network 445 is an internal network, such as a LAN, connection to the external network (e.g., Internet) may be established with one or more servers (460). In one embodiment, servers 460 may also provide data and/or program instructions/code for use by or execution on DPS 105. In one or more embodiments, access to external storage 455 may also be via a storage adapter (not shown), which may maintain a communication or (data transfer) link, such as a fiber channel link, to external storage 455. External storage can include one or more storage repositories containing data that is stored and/or accessed during processing of the various methods described herein. The data can be accessed by DPS 105 and downloaded and stored on local storage 450 or within system memory 410 for utilization with local processing.

In one implementation, DPS 105 can connect to a debug communication interface (or debug interface) 120 via one or more of a USB connector (421), an Ethernet adapter (not specifically shown, but assumed to be included within NID 440) or a network (445). The possible alternative connection methods between debug interface 120 to DPS 105 via a network adapter or via a network are illustrated as dashed connection lines representing cables connecting to the debug interface 120. Debug interface 120 enables debugger 430 to connect to and trigger or control execution of one or more debug sessions on a connected target device. Debug interface 120 includes packet converter module/utility that enables conversion of received packets from the DPS 105 into a protocol that is understood by the device 130. As further described below, debug interface 120 can also include an LPM utility 435 and/or functional components of an LPM utility 435 for use as described herein. It is appreciated that the connection of the debug interface 120 to DPS 105 can be via a standard USB or serial port when the debug interface 120 is locally connected. Alternatively, in another embodiment, the DPS 105 and debug interface 120 can be communicatively connected via a network interface when the DPS 105 that is executing the debugger 430 is not physically located in a same location (i.e., is geographically separated) as the debug interface 120.

Those of ordinary skill in the art will appreciate that the hardware components and basic configuration depicted in FIG. 4 may vary. The illustrative components within DPS 105 are not intended to be exhaustive, but rather are representative to highlight essential components that are utilized to implement the present invention. For example, different configurations of data processing systems/devices may be utilized containing other devices/components, which may be used in addition to or in place of the hardware depicted. The depicted example is not meant to imply architectural or other limitations with respect to the presently described embodiments and/or the general invention. The data processing system depicted in FIG. 4 may be any processing device capable of supporting the debug features described herein.

In addition to the above described hardware components of DPS 105, various features of the invention are completed/supported via one or more executable program code or software modules (or firmware) and data loaded into system memory 410 from one or more non-volatile storage (e.g., local system storage 450 or external storage 455). During implementation of one or more of the methods of the described embodiments, the one or more program code or software modules are executed by CPU 405 or, in alternate embodiments, by some other instruction execution mechanism associated with DPS. Thus, for example, illustrated within system memory 410 are a number of software/firmware/logic components, including operating system (OS) 425 (e.g., Microsoft Windows®, a trademark of Microsoft Corp, or GNU®/Linux®, registered trademarks of the Free Software Foundation and The Linux Mark Institute, or Advanced Interactive Executive (AIX), a registered trademark of International Business Machines). One or more applications 427 are also shown within system memory 410, and these applications may be utilized within the debug process or may be independent of the debug process.

Also included within system memory 410 is debugger module (or debugger) 430, which comprises a plurality of functional modules and/or data, including debug simulation engine 432, debug input data/code 434, and low power mode debug (LPM) utility 435. Debugger 430 also comprises user interface 115. LPM utility 435 may be provided as an add-on enhancement to an existing debugger in order to support debugging of devices that are designed with a CS register and specific PMM logic that supports the debugging of a return from low power mode of the target device. In one embodiment, LPM utility 435 or specific functional features of LPM utility 435 may be provided by/on debug interface 120. With this embodiment, certain aspects related to the interfacing with the CS register(s) 150 and responding to detection of entry into and exit out of a low power mode of the device, which have been previously described as being completed by debugger, can alternatively be completed by LPM utility 435 on debug interface 120.

In one embodiment, certain features associated with LPM utility 435 and/or LPM utility 435 itself may be available via a software deploying server (e.g., server 460), and DPS 105 communicates with the software deploying server (460) via network 445 using network interface 440. Then, LPM utility 435 may be deployed from/on/across the network, via software deploying server 460. With this configuration, software deploying server (460) can perform certain of the functions associated with the execution of LPM utility 435, in one embodiment. Alternatively, software deploying server 460 is configured to enable DPS 105 to download the executable code required to implement the various features of the LPM utility 435.

During execution of debugger 430, the functions of LPM utility 435 are performed in a seamless/integrated manner with the other debug operations, such that debugger 430 presents as a single, cohesive component, which provides/supports the LPM debug functionality of LPM utility 435. For simplicity, references to the functions and/or features provided/supported by LPM utility 435 will hereafter be simply referred to as functions performed by and/or features of debugger 430.

In the described embodiments, CPU 405 executes debugger 430 (and/or LPM utility 435), as well as or in conjunction with OS 425, and debugger 330 enables DPS 105 to perform certain functions when specific code segments (of LMP utility 435) are executed by CPU 405. Among the program code/instructions or processing logic provided by debugger 430, and which are specific to the invention, are code/logic that when executed by the processor/CPU 405 enable DPS 105 and/or debugger 430 to perform the functions of: (a) transmitting, via a connection to the device, a first CS register command which sets a first entry of the CS register; (b) periodically receiving debug data and state information of processing occurring at the device from one or more debugs located on the device; (c) storing the received debug data and state information within a storage; (d) detecting a condition on the connector that indicates the device has entered into a low power mode; (e) responsive to detecting that the device has entered into the low power mode: (e1) suspending transmission of debug commands to the device; (e2) monitoring for receipt of a signal that indicates that the device is no longer in low power mode, where the signal includes a detected change in the condition on the connector that allows further communication with the device; (f) receiving from the CS register a value of a third entry of the CS register, which indicates whether the low power mode (LPM) was of a first type of low power modes that requires a reset of one or more debugs within the device; (g) in response to the LPM not being a first type, resuming the debug operation for the device; (h) in response to the LPM being a first type LPM: retrieving and forwarding stored debug data and state information associated with the one or more debugs to restore the debugs to a pre-LPM state just prior to the entry of the device into the low power mode; (i) in response to completion of a transmission of information required to restore the debugs on the device to the pre-LPM state: (i1) transmitting via the connection to the device, a second CS register command, which sets a second entry of the CS register; (i2) resuming the debug operations for the device; and (i3) capturing debug information related to an exit by the device from the low power state.

In the illustrative embodiment, the first entry is an exit hold reset enable (EHRE) bit and the first CS register command is a signal which sets the EHRE bit to a logic 1 value. Also, the second entry is an exit hold reset release (EHRR) bit and the second CS register command is a signal which sets the EHRR bit to a logic 1 value. Then, the setting of the EHRR bit causes the PMM to assert a reset signal to one or more core components of the device to resume processing operations of the device. Additionally, in the illustrative embodiment, the third entry is an LPM status bit that is set by the PMM of the device to a logic 1 value when the LPM is a first type LPM. Each entry of the CS register has a value of logic zero (0) when the entry is not set.

In one embodiment, the debugger further performs the functions of outputting, via an output device, a debugger interface that provides a debug output about the device including debug information captured as the device exits from the low power mode. The debugger further identifies within the debug output which debug information corresponds to debug information that is captured as the device exits from the low power mode.

In one implementation, the detecting that the device has entered into the low power mode includes the debugger detecting a loss of communication with the device during an ongoing debug session. Then, the debugger performs the functions of monitoring for receipt of a signal that indicates that the device is no longer in low power mode by periodically polling the connection to the device to detect when a communication request issued to the device receives an active response.

As previously stated, the above and additional features and/or functions of the debugger 430 are provided as the debugger 430 executes within the DPS 105 of FIG. 4, which is provided within the system 100 of FIG. 1. Other features/functions provided by execution of debugger 430 on DPS 105 are described with reference to the flow chart of FIG. 5, which is described below. Among these additional features are features related to a computer implemented method for debugging, via a debugger application, a device configured with a power management module (PMM), one or more debug components and one or more control and status (CS) registers, which are communicatively accessible to the debugger application. As provided within one embodiment, the method comprises: transmitting, via a connection to the device, a first command which sets a value of a first entry of the one or more CS registers to a first value. The first value indicates that a debugging session being performed on the device should include debugging an exit by the device from a first type low power mode. The setting of the value of the first entry to the first value causes the PMM to prevent one or more core logic of the device from resuming operations following an exit of the device from the first type low power mode. The method also comprises: responsive to receiving information indicating that the device has exited from the first type low power mode, transmitting information to the device to re-configure the one or more debug components to respective debug states existing prior to entry of the device into the first type low power mode. Then, in response to completion of a reconfiguration of the one or more debug components following an exit by the device from the first type low power mode: the method comprises resuming the debug session for the device; and transmitting to the device a second command, which sets a second value of a second entry of the one or more CS registers to a second value. The second value indicates to the PMM that the reconfiguration of the debug components is complete, and the PMM responds to detection of the second value within the second entry of the CS registers by enabling the one or more core logic to resume processing operations.

According to one embodiment, the method also includes: periodically receiving debug session data and state information from the one or more debug components on the device and one or more of the CS registers; responsive to receiving information indicating that the device has entered into the low power mode, suspending transmission of debug commands to the device; and responsive to receiving information indicating that the device has exited from a second type low power mode, resuming the debug session for the device without initiating reconfiguration of the one or more debug components.

In yet another embodiment, the method comprises: detecting a loss of communication with the device during an ongoing debug session; suspending the debug session while the loss of communication continues; when communication is re-established with the device, receiving next information from the device; and identifying from the received next information that the loss of communication was due to entry of the device into a low power mode. The method further includes: determining whether the low power mode is a first type low power mode; and in response to the low power mode being a first type low power mode, initiating the transmitting to the device of the second command. Also, in response to the debugger application receiving debug session data and state information after the device has exited from a low power mode, the method includes tagging the received data and state information as being associated with the exit from the low power mode. The debugger application is able to identify which debug data corresponds to the device exiting the low power mode. According to the described embodiments, the first entry is an exit hold reset enable (EHRE) bit and the first command is a signal which sets the EHRE bit to a logic 1 value; the second entry is an exit hold reset release (EHRR) bit and the second command is a signal which sets the EHRR bit to a logic 1 value; and setting of the EHRR bit triggers the PMM to perform one or more functions from among: (a) when the PMM withholds power from the one or more core logic on exit from the low power mode until the EHRR bit is set to the logic 1 value, applying power to the one or more core logic to enable the core logic to resume processing operations of the device; and (b) when the PMM asserts a reset signal to the one or more core logic on exit of the device from the low power mode and continues to assert the reset signal until the EHRR bit is set to the logic 1 value, negating an assertion of the reset signal to enable the one or more core logic to resume processing operations of the device.

With the implementation of the functional components of DPS 105, one embodiment provides for a data processing system comprising: a processor; a memory coupled to the processor; an interface mechanism that enables connection to a device that includes a control and status (CS) register and a power management module (PMM). The DPS 105 further comprises a debugger application that is executing on the processor and which comprises low power mode debug (LPM) utility. The LPM utility executes on the processor to perform the functions of: transmitting a first signal via the interface mechanism to set a first entry of the CS register to a first value, which triggers the PMM of the device to withhold negation or release of a reset signal to one or more processing resources of the device until a debug session is resumed to capture the return of the device from a low power mode. The utility further provides functions of: responsive to a detection of a condition indicating that the device has entered into a low power mode: suspending debugging of the device; and monitoring for a return of the device from the low power mode; responsive to detection of the return of the device from the low power mode: receiving, via the interface mechanism, a value of a third entry of the CS register; in response to the third entry having a first value indicative of a return from a VLLS state, which indicates that state was lost for the debug components during the low power mode event: forwarding information, via the interface mechanism, to one or more debugs within the device to restore the one or more debugs to a desired state that existed prior to entry of the device into the low power mode; in response to completing the forwarding of the information to the one or more debugs, transmitting a second signal via the interface mechanism to set a second value of a second entry of the CS register to a release value, and the release value is detected by the PMM, which asserts the reset signal to enable the one or more processing resources of the device to resume processing operations.

In response to the third entry having a second value indicative of a return from a LLS state, the debugging application provides the functions of: resuming the debug session without registering debug information as being associated with a very low power mode; and transmitting the second signal to set the second value to the release value. Additionally, in one alternate embodiment, a forth entry of the CS is provided to indicate a return from the LLS state. The debugging application then provides the functions of: in response to receiving a first value from a fourth entry of the CS register, which value indicates that the device has returned from a LLS state, performing the resuming of the debug session without re-configuring the one or more debug components.

According to one embodiment, the third entry of the CS register is set by the PMM; the first entry has a null value following return by the device from a low power mode and is only set to the first value when the debugger transmits the first signal; and the second entry has a null value following return by the device from a low power mode that is considered a hold value by the PMM, which withholds the negation or release of the reset signal when the hold value is present within the second entry.

The data processing system further comprises an output device, and the LPM utility further performs the functions of: outputting via the output device a debugger interface that provides a debug output about the device including debug information captured as the device exits from the low power mode; and identifying within the debug output which debug information corresponds to debug information captured as the device exits from the low power mode.

Figure 5A:
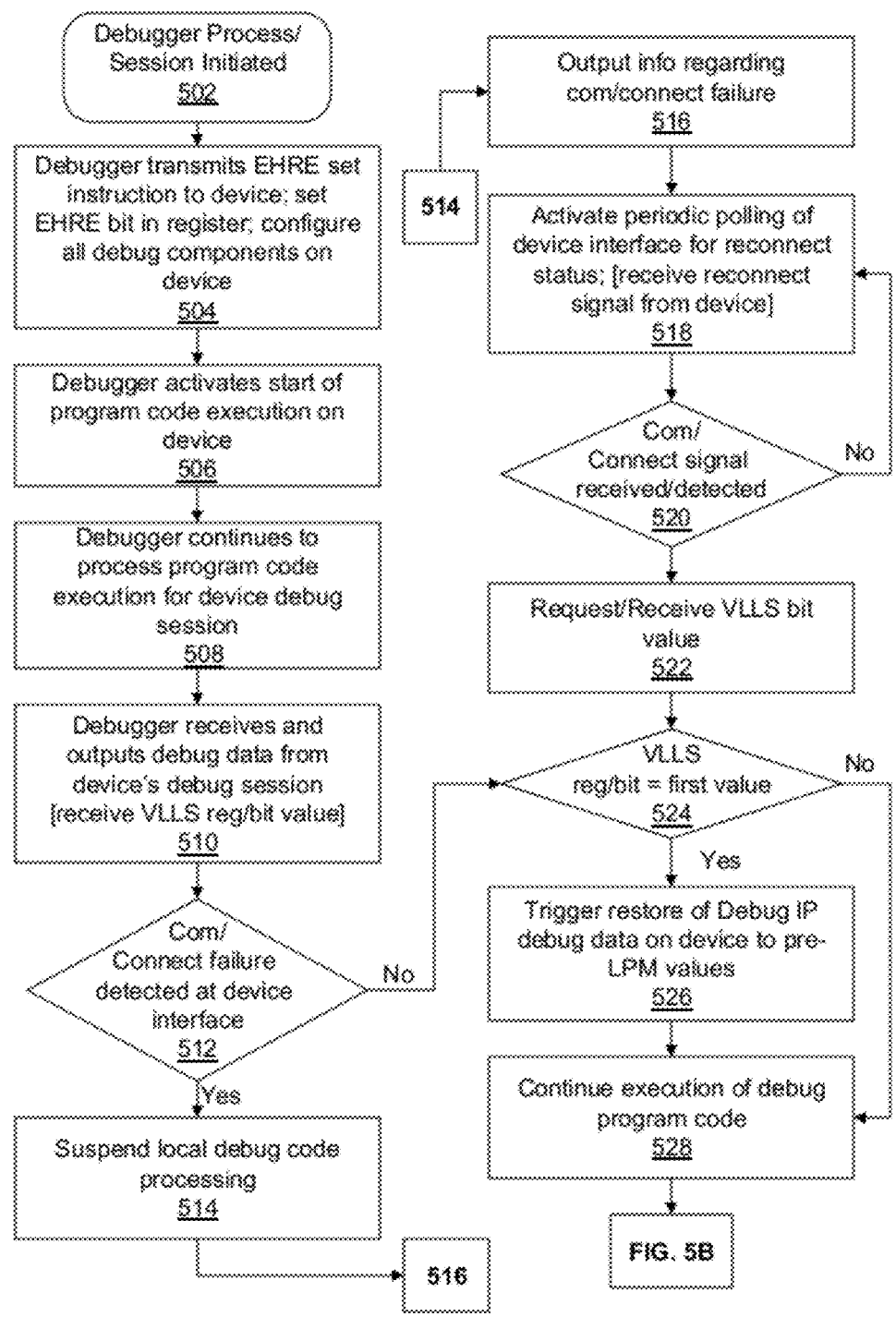
FIG. 5 is a flow chart illustrating the method by which the debugger executing on a processor of a data processing system provides debugging functionality to enable debugging of a target device in response to the target device exiting from a low power mode, according to one embodiment.
Figure 5B:
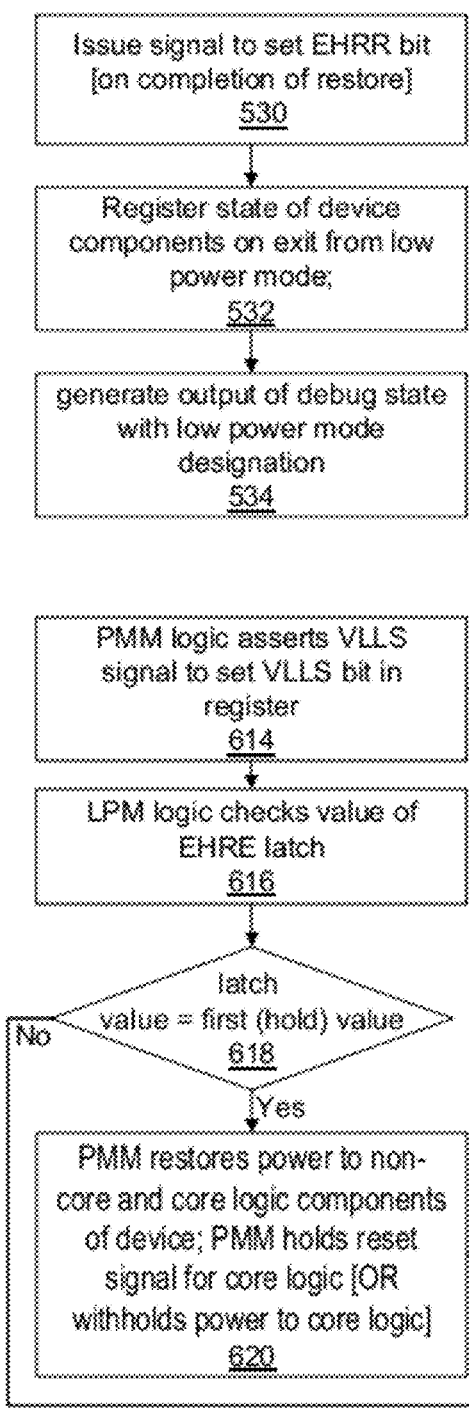
Figure 6:
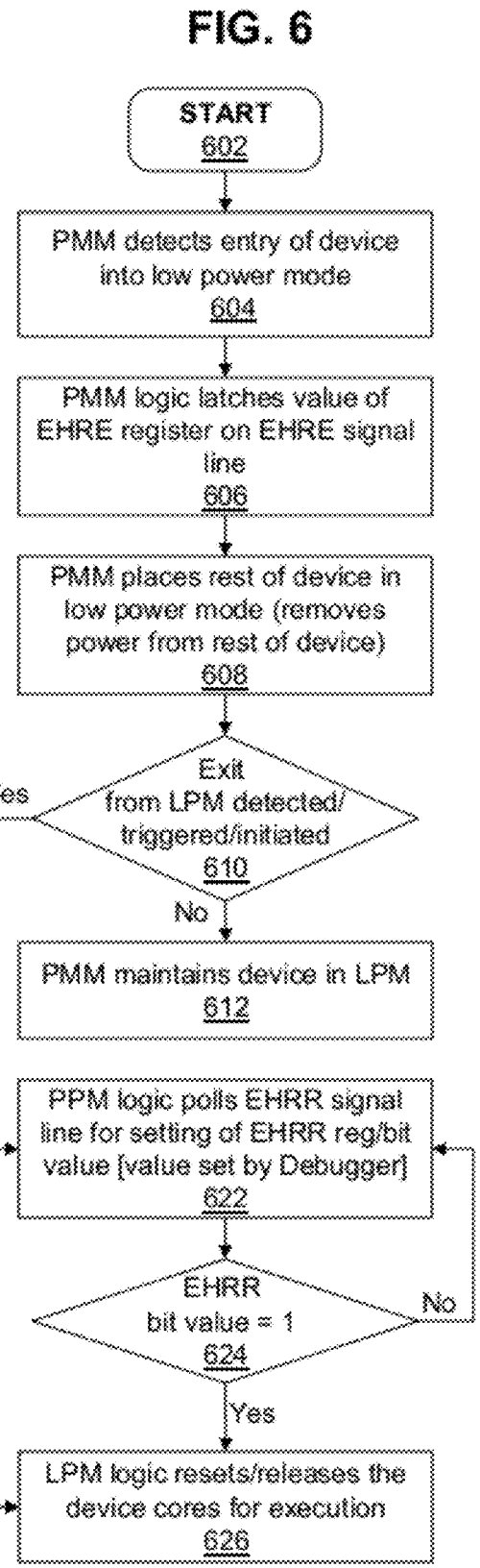
FIG. 6 is a flow chart illustrating the processes within the method by which a PMM of a target device controls, based on received/detected CS register values, the timing in which operations of specific core components within the device are reset, following an exit of the device from low power mode, according to one embodiment of the invention.

FIGS. 5 and 6 are flow charts illustrating various methods by which the above processes of the illustrative embodiments are completed. Although the methods illustrated in FIGS. 5 and 6 may be described with reference to the systems/devices and associated components illustrated by FIGS. 1-4, it should be understood that this is merely for convenience and alternative system and device configurations and components can be employed when implementing the various methods. Specific portions of the method related to the debugger (FIG. 5) may be completed by execution of code associated with LPM utility 435 executing on processor 405 within DPS 105 (FIG. 4) and controlling specific operations debugger 430 on DPS 100, and the FIG. 5 method is thus described from the perspective of one or more of debugger 430, LPM utility 435, and/or DPS 105. Additionally, specific portions of the method related to the lower power mode operations of the device (FIG. 6) may be completed by execution of code associated with LPM utility 435/debugger 430 executing on processor 405 within DPS 105 (FIG. 4) or logic within PPM 155 on device 130 to control setting and resetting of CS register entries, and the FIG. 6 method is thus described from the primary perspective of PPM 155, with an understanding that specific functions may be performed/triggered by debugger 430 and particularly LPM utility 435 executing on DPS 105.

Referring now to FIG. 5, there is illustrated a flow chart of a computer implemented method for debugging a device configured with a control and status (CS) register that is communicatively coupled to a power management module (PMM). The method begins when the debugger process/session is activated/initiated on the data processing system and is configured by the user (block 502). The debugger transmits/ issues an EHRE set instruction to the target device, and the EHRE set instruction is transmitted via the interface mechanism established between the DPS and the target device (block 504). This transmission of the EHRE set instruction results in the setting of the bit in the EHRE register 352 (or the first entry of the CS register 150) to a logic high (1). The debugger also configures (i.e., sets the states) for the one or more debug components on the device. The debugger 430 activates the start of debugging code for the specific target device (block 506).

With the EHRE bit set, the debugger continues to process program code execution for the device debug session (block 508). The debugger continues to receive debug data from the debug components on the device and outputs the debug data as programmed (block 510). In one embodiment, the VLLS bit value (from the third entry of CS register(s) 150) is also received along with the debug data. The LLS bit value may also be received along with the debug data, in one embodiment. The receipt of these various debug data can be periodic, as on a pre-set schedule, or can occur as conditions are encountered on the device that generates debug data of relevance to the debugger. When the device later enters into a low power mode, and communication with the device is lost, a check is made at decision block 512 whether there was a loss of communication (or a failure in the connection to the device detected on the interface mechanism). When such a failure/loss of connection is detected, the debugger suspends local debug code processing for ongoing debug of the device to prevent the debugger from crashing (block 514). In one embodiment, the debugger also outputs information within the debug output indicating the communication/connection failure detected (block 516). The debugger then activates a periodic polling of the device interface to check on the reconnect status of the device (block 518). At decision block 520, the debugger determines whether the communication with the device has been re-established, and if the communication is successfully re-established (indicating that the device is back online or has exited from the low power mode), the debugger queries the VLLS status register 356 to determine if the device has just returned from a first type low power mode.

In an alternate embodiment, the value of the VLLS bit may be autonomously communicated to the debugger within a device handshake to the debugger indicating that the device is back online. In yet another embodiment, the debugger can periodically receive status information, which includes the values of the VLLS bit and the debugger can then respond accordingly. For example, certain types of devices may enter into a low power mode without resulting in a loss of communication between the debugger and the device. In such scenarios, the debugger will not detect or receive notice of an occurrence of a loss of communication, and the debugger will therefore not perform the steps indicated at blocks 514-522. However, by periodically receiving an update of the current status of the VLLS bit/entry, the debugger is still able to respond to the occurrence of a low power mode event soon after the device returns from the low power mode. Returning now to the flow chart, with the value of the VLSS bit received from the CS register(s) 150 (either via the sequence of blocks 514-522 or via the periodic notification mechanism of the alternate embodiment), the debugger determines (block 524) whether the VLLS bit equals a first value (e.g., a logic high (1)), which indicates that the device did return from a first type low power mode. When the VLLS bit value is the first value (and not a null value), the debugger triggers the restore of the debug components states on the device to the states that existed before entry by the device into the low power mode (block 526). The debugger then resumes execution/issuing of debug program code to the device (block 528).

Once the debugger completes the process of re-configuring the debug components on the device, the debugger transmits a signal to set the EHRR register value to a logic high (1) (block 530). The debugger then retrieves and registers the state of the core on exit from the low power mode (following a reset by the PMM) (block 532), and the debugger generates an output of the debug state covering the entry and exit from low power mode, with the output designated/indicated as being associated with the device's entry/exit into/from the low power state (block 534).

With the described embodiments, the debugger can continue a software debug session in a controlled manner regardless of whether or not the device periodically (or otherwise) enters and/or exits low power modes, in which the power to most of the device is turned off to conserve power. As a result of the power loss, communication between the debugger and the device is lost, and the device's debug configuration may have been lost as well.

According to one embodiment, the debugger includes: a utility for (a) generating a first signal which is transmitted over the interface mechanism and sets the first entry value and (b) generating a second signal which is transmitted over the interface mechanism and sets the second entry value following detection of a return from low power mode of the target device. As described further herein, the debugger's setting of the first entry value asserts a first high value on a first signal line to the PMM, and PMM logic responds to detection of entry of the target device into a low power mode by latching a value asserted on the first signal line. Further, the debugger's setting of the second entry value asserts a second high value on a second signal line to the PMM, and the PMM logic responds to detection of the negation or release of the second high value on the second signal line by asserting a reset command to the first set of components.

The debugger detects when the target device enters the low power mode in response to a detected loss of communication with the device. When the device enters into the low power mode, one or more debug components of the device loses power and consequently loses its debug data and debug state, which would be required for continuation of the same debug session when the device resumes operation. As described herein, execution of the debug recovery method does not rely on an external debug request input, or other logic within the CPU. As presented, the debugger selectively controls the reset and/or clocks to the device's processing cores (or CPUs) in order to postpone vector fetch until after the debugger has reconnected to the device, and configured the debug resources to their prior state (before entry into the low power mode).

FIG. 6 provides the method process which occurs from the device side of the debug system. The process of FIG. 6 begins at initiator block 602 and proceeds to block 604, at which the PMM detects entry of the device into a low power mode. The PMM logic latches the current value of the EHRE register, which value is asserted on the EHRE signal line (block 606). The PMM removes power from the rest of the components of the device (block 608). The PMM later determines whether an input is received which triggers the return of the device from the low power mode (block 610). When no input is received, the PMM maintains the device in the low power mode (block 612). When the return from low power mode signal/input is detected, PMM logic asserts the VLLS signal line to set the VLLS status register value to a logic high (1) (block 614). PMM logic checks the value within the latch 270 (block 616) and determines whether the value is a first value (1) that would indicate that the PMM should maintain the reset of the cores until a release signal is received from the debugger (block 618). When the latch value is the first value, PMM logic restores power to the secondary (i.e., other than the processing core) components of the device (block 620). In a first embodiment, in which the core components includes embedded or attached debug components, PMM logic also restores power to the core components to allow restore/reconfiguration of the debug components to their desired states, but PMM maintains or holds the core logic themselves in reset. Alternatively, in another embodiment, the PMM prevents the core logic from receiving any clocks (during and/or after reset/power) and thus prevents the core from resuming until explicitly released by the debugger. This alternate embodiment can be accomplished via an intermediary component of the device that is able to control clock cycle allocations to the core logic on receipt of a trigger from the PMM. In a second embodiment in which the core components are separately powered from all of the debug components, PMM may simply withhold power from the core logic altogether to prevent those core components from powering up to resume/begin operations. Regardless of the implementation, PMM effectively prevents the cores from initiating core processing until PMM detects that the debugger has set the value of the EHRR bit to a specific value (logic 1), which value indicates that the PMM can release or negate the hold on the cores (or apply power to the cores, in the alternate embodiment).

PMM logic then polls the EHRR signal line for negation or release (by the debugger's transmission of a set command to the EHRR entry/bit/register) of the reset of the core (block 622). When the EHRR value is set to a logic high within the EHRR register, the EHRR value is asserted on (i.e., transmitted by) the EHRR line to the PMM (block 624), and the PMM logic negates or releases the assertion of the reset to the core components, which then resume processing (block 626).

In the flow charts above, one or more of the methods are embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

As presented by the described embodiments, the above method is performed within a device configured to enable debugging of a return by the device from a low power mode state. The device comprises: a first set of components that process instructions and performs functional operations of the device; a second set of components that facilitates debugging operations of the device and which maintain one or more current debug states while receiving power; and a power management module (PMM) having PMM logic that performs the functions of: in response to receiving an input to activate a return of the device from a low power state in which power was removed from the first set of components and the second set of components: determining a type of low power mode from which the device is returning; and in response to the device returning from a first type low power mode in which the current debug states of the second set of components are lost, preventing one or more of the first set of components from resuming processing operations until the second set of components have been re-configured to their respective current debug states.

The PMM logic of the device further performs the functions of: detecting an entry of the device into the low power mode; in response to detecting the device's entry into the low power mode, automatically asserting a reset signal to the first set of components; continuing to assert the reset signal in response to the device returning from the first type low power mode; receiving an input indicating an assertion of the reset signal is no longer required; and in response to receiving the input indicating the assertion of the reset signal is no longer required, automatically negating the reset signal to enable the first set of components to resume processing.

In one embodiment, the PMM comprises a power allocation mechanism for granularly applying power to the first set of components, separate and independent from applying power to the second set of components; and the PMM logic further performs the functions of: responsive to a return from a first type low power mode: immediately applying power to the second set of components; and delaying an application of power to the first set of components until receipt of the input indicating that the second set of components have been re-configured to their respective current debug states.

In one embodiment, the one or more CS registers are coupled to the PMM via one or more signal lines and the PMM includes a latch. In response to the PMM detecting an entry by the device into the low power mode, the PMM logic latches into the latch a current value of a first entry of the CS register. Then, in response to a return of the device from the low power mode, the logic performs the functions of: checking a latched value saved within the latch, and in response to the latched value being a first value: withholding a negation of a reset signal to the first set of components. The negation of the reset signal is required to enable the first set of components to enter into an operational state. The PMM logic further detects a current value of the second entry of the one or more CS registers; and responsive to the current value associated with the second entry being the second value, the PMM logic negates the reset signal to the first set of components.

In one embodiment, the device comprises a communication interface that enables communication by an external debugger with the device. The external debugger is communicatively coupled to the second set of components and to one or more CS registers to enable the external debugger to: exchange debug information with the second set of components; set a value of one or more entries of the CS register; receive one or more values from one or more entries of the CS register; and restore state of the second set of components to the current debug state that existed prior to entry of the device into a first type low power mode.

In yet another embodiment, the PMM logic further performs the functions of: determining when a low power mode from which the device is exiting is a first type low power state that requires a restore of one or more debugs components among the second set of components to enable seamless resumption of debugging operations on the device to capture debug data covering the exit by the device from the low power mode; and in response to the low power mode being the first type low power mode, automatically setting a value of a third entry of the CS register to indicate that the low power mode was a first type low power mode to trigger a hold of a negation of the reset of the device. The withholding of the negation of the reset enables the external debugger to first restore the one or more debug components to the before the reset signal is negated by the PMM logic.

As will be appreciated by one skilled in the art, the present invention may be embodied as a method, system, and/or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," "logic", or "system." Furthermore, the present invention may take the form of a computer program product on a computer-usable storage medium having computer-usable program code embodied in or on the medium.

As will be further appreciated, the processes in embodiments of the present invention may be implemented using any combination of software, firmware, microcode, or hardware. As a preparatory step to practicing the invention in software, the programming code (whether software or firmware) will typically be stored in one or more machine readable storage mediums such as fixed (hard) drives, diskettes, magnetic disks, optical disks, magnetic tape, semiconductor memories such as RAMs, ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The medium may be electronic, magnetic, optical, electromagnetic, infrared, or semiconductor system (or apparatus or device) or a propagation medium. Further, the medium may be any apparatus that may contain, store, communicate, propagate, or transport the program for use by or in connection with the execution system, apparatus, or device. The methods of the invention may be practiced by combining one or more machine-readable storage devices containing the code according to the described embodiment(s) with appropriate processing hardware to execute the code contained therein. An apparatus for practicing the invention could be one or more processing devices and storage systems containing or having network access (via servers) to program(s) coded in accordance with the invention. In general, the term computer, computer system, or data processing system can be broadly defined to encompass any device having a processor (or processing unit) which executes instructions/code from a memory medium.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A device configured to enable debugging of a return by the device from a low power mode state, the device comprising:
   a first set of components that process instructions and performs functional operations of the device;
   a second set of components that facilitates debugging operations of the device and which maintain one or more current debug states while receiving power;
   a power management module (PMM) having PMM logic that in response to receiving an input to activate a return of the device from a low power state in which power was removed from the first set of components and the second set of components: determines a type of low power mode from which the device is returning, where the type is one of a plurality of different types of low power modes; and in response to the device returning from a first type low power mode in which the current debug states of the second set of components are lost, prevents one or more of the first set of components from resuming processing operations until the second set of components have been re-configured to their respective current debug states;
   wherein the PMM logic further: detects an entry of the device into the low power mode; automatically asserts a reset signal to the first set of components in response to detecting the device's entry into the low power mode; continues to assert the reset signal in response to the device returning from the first type low power mode; receives an input indicating an assertion of the reset signal is no longer required; and automatically negates the reset signal to enable the first set of components to resume processing, in response to receiving the input indicating the assertion of the reset signal is no longer required.

2. The device of claim 1, wherein:
   the PMM comprises a power allocation mechanism for granularly applying power to the first set of components, separate and independent from applying power to the second set of components; and
   in response to a return from a first type low power mode, the PMM logic: immediately applies power to the second set of components; and delays an application of power to the first set of components until receipt of the input indicating that the second set of components have been re-configured to their respective current debug states.

3. The device of claim 1, wherein the PMM logic prevents one or more of the first set of components from resuming processing operations until the second set of components have been re-configured to their respective current debug states by withholding allocation of clock cycles to the one or more first set of components.

4. A device configured to enable debugging of a return by the device from a low power mode state, the device comprising:
   a first set of components that process instructions and performs functional operations of the device;

a second set of components that facilitates debugging operations of the device and which maintain one or more current debug states while receiving power;

a power management module (PMM) having PMM logic that in response to receiving an input to activate a return of the device from a low power state in which power was removed from the first set of components and the second set of components: determines a type of low power mode from which the device is returning, where the type is one of a plurality of different types of low power modes; and in response to the device returning from a first type low power mode in which the current debug states of the second set of components are lost, prevents one or more of the first set of components from resuming processing operations until the second set of components have been re-configured to their respective current debug states;

one or more control and status (CS) registers having: a first entry that is settable to a first value, which indicates a debug of the device's entry and exit from a low power mode is to be performed; and a second entry that is settable to a second value, which indicates to the PMM logic that the one or more first set of components can be allowed to resume processing operations.

5. The device of claim 4, wherein the PMM logic further: detects an entry of the device into the low power mode; automatically asserts a reset signal to the first set of components in response to detecting the device's entry into the low power mode; continues to assert the reset signal in response to the device returning from the first type low power mode; receives an input indicating an assertion of the reset signal is no longer required; and automatically negates the reset signal to enable the first set of components to resume processing, in response to receiving the input indicating the assertion of the reset signal is no longer required.

6. The device of claim 5, wherein the one or more CS registers comprise: a third entry that is settable by the PMM logic to a third value, which indicates that the low power mode was a first type low power mode; and a fourth entry that is settable by the PMM logic to a fourth value, which indicates that the low power mode was a second type low power mode.

7. The device of claim 6, wherein: the one or more CS registers are located within the PMM; the value within the first entry is set/reset by receipt of signals from a debugger; and the value within the second entry is set by the receipt of a signal from the debugger and reset by one of the PMM logic and the debugger following resumption of processing operations by the first set of components.

8. The device of claim 6, wherein:
the one or more CS registers are coupled to the PMM via one or more signal lines;
the PMM comprises a latch; and
in response to detection of an entry by the device into the low power mode, the PMM logic latches into the latch a current value of a first entry of the CS register; checks a latched value saved within the latch, in response to a return of the device from the low power mode; and in response to the latched value being a first value: withholds a negation of a reset signal to the first set of components, wherein the negation of the reset signal is required to enable the first set of components to enter into an operational state; detects a current value of the second entry of the one or more CS registers; and negates the reset signal to the first set of components, in response to the current value associated with the second entry being the second value.

9. A device configured to enable debugging of a return by the device from a low power mode state, the device comprising:
a first set of components that process instructions and performs functional operations of the device;
a second set of components that facilitates debugging operations of the device and which maintain one or more current debug states while receiving power;
a power management module (PMM) having PMM logic that in response to receiving an input to activate a return of the device from a low power state in which power was removed from the first set of components and the second set of components: determines a type of low power mode from which the device is returning, where the type is one of a plurality of different types of low power modes; and in response to the device returning from a first type low power mode in which the current debug states of the second set of components are lost, prevents one or more of the first set of components from resuming processing operations until the second set of components have been re-configured to their respective current debug states;
a power supply connection for receiving power for powering the device;
one or more control and status (CS) registers having a plurality of entries utilized to enable debugging of a return of the device from a low power mode; and
a communication interface that enables communication by an external debugger with the device, wherein the external debugger is communicatively coupled to the second set of components and to one or more CS registers to enable the external debugger to: exchange debug information with the second set of components; set a value of one or more entries of the CS register; receive one or more values from one or more entries of the CS register; and restore state of the second set of components to the current debug state that existed prior to entry of the device into a first type low power mode.

10. The device of claim 9, wherein the PMM logic further: detects an entry of the device into the low power mode; automatically asserts a reset signal to the first set of components in response to detecting the device's entry into the low power mode; continues to assert the reset signal in response to the device returning from the first type low power mode; receives an input indicating an assertion of the reset signal is no longer required; and automatically negates the reset signal to enable the first set of components to resume processing, in response to receiving the input indicating the assertion of the reset signal is no longer required.

11. The device of claim 9, wherein the one or more CS registers include: a first entry that is settable to a first value, which indicates a debug of the device's entry and exit from a low power mode is to be performed; and a second entry that is settable to a second value, which indicates to the PMM logic that the one or more first set of components can be allowed to resume processing operations.

12. The device of claim 9, wherein the PMM logic determines when a low power mode from which the device is exiting is a first type low power state that requires a restore of one or more debugs components among the second set of components to enable seamless resumption of debugging operations on the device to capture debug data covering the exit by the device from the low power mode; and in response to the low power mode being the first type low power mode, automatically sets a value of a third entry of the CS register to indicate that the low power mode was a first type low power mode to trigger a hold of a negation of the reset of the device; wherein the hold on the negation of the reset enables the external debugger to first restore the one or more debug components to the before the reset signal is negated by the PMM logic.

13. A device configured to enable debugging of a return by the device from a low power mode state, the device comprising:
a first set of components that process instructions and performs functional operations of the device;
a second set of components that facilitates debugging operations of the device and which maintain one or more current debug states while receiving power;
a power management module (PMM) having PMM logic that in response to receiving an input to activate a return of the device from a low power state in which power was removed from the first set of components and the second set of components: determines a type of low power mode from which the device is returning, where the type is one of a plurality of different types of low power modes; and in response to the device returning from a first type low power mode in which the current debug states of the second set of components are lost, prevents one or more of the first set of components from resuming processing operations until the second set of components have been re-configured to their respective current debug states;
wherein the PMM logic determines when a low power mode from which the device is exiting is a first type low power state that requires a restore of one or more debugs components among the second set of components to enable seamless resumption of debugging operations on the device to capture debug data covering the exit by the device from the low power mode; and in response to the low power mode being the first type low power mode, automatically sets a value of a third entry of a control and status (CS) register to indicate that the low power mode was a first type low power mode to trigger a hold of a negation of the reset of the device; wherein the hold on the negation of the reset enables the external debugger to first restore the one or more debug components to the before the reset signal is negated by the PMM logic.

14. The device of claim 13, wherein the PMM logic further: detects an entry of the device into the low power mode; automatically asserts a reset signal to the first set of components in response to detecting the device's entry into the low power mode; continues to assert the reset signal in response to the device returning from the first type low power mode; receives an input indicating an assertion of the reset signal is no longer required; and automatically negates the reset signal to enable the first set of components to resume processing, in response to receiving the input indicating the assertion of the reset signal is no longer required.

15. The device of claim 13, wherein the one or more CS registers include: a first entry that is settable to a first value, which indicates a debug of the device's entry and exit from a low power mode is to be performed; and a second entry that is settable to a second value, which indicates to the PMM logic that the one or more first set of components can be allowed to resume processing operations.

16. The device of claim 13, further comprising:
a power supply connection for receiving power for powering the device; and
a communication interface that enables communication by an external debugger with the device, wherein the external debugger is communicatively coupled to the second set of components and to the one or more CS registers having a plurality of entries utilized to enable debugging of a return of the device from a low power mode, and which enables the external debugger to: exchange debug information with the second set of components; set a value of one or more entries of the CS register; receive one or more values from one or more entries of the CS register; and restore state of the second set of components to the current debug state that existed prior to entry of the device into a first type low power mode.

17. A computer implemented method for debugging, via a debugger application, a device configured with a power management module (PMM), one or more debug components and a plurality of control and status (CS) registers, which are communicatively accessible to the debugger application, the method comprising:
transmitting, via a connection to the device, a first command which sets a value of a first entry of the plurality of CS registers to a first value, wherein the first value indicates that a debugging session being performed on the device should include a debug of an exit by the device from a first type low power mode;
wherein setting the value to the first value causes the PMM to prevent one or more core logic of the device to not resume operations following an exit of the device from the first type low power mode;
periodically receiving debug session data and state information from the one or more debug components on the device and one or more of the plurality of CS registers;
responsive to receiving information indicating that the device has entered into the low power mode, suspending transmission of debug commands to the device;
responsive to receiving information indicating that the device has exited from a second type low power mode, resuming the debug session for the device without initiating reconfiguration of the one or more debug components; and
responsive to receiving information indicating that the device has exited from the first type low power mode, transmitting information to the device to re-configure the one or more debug components to respective debug states existing prior to entry of the device into the first type low power mode.

18. The computer implemented method of claim 17, further comprising:
in response to completion of a reconfiguration of the one or more debug components following an exit by the device from the first type low power mode:
resuming the debug session for the device; and
transmitting to the device a second command, which sets a second value of a second entry of the plurality of CS registers to a second value, wherein the second value indicates to the PMM that the reconfiguration of the debug components is complete and wherein the PMM responds to detection of the second value within the second entry of the CS registers by enabling the one or more core logic to resume processing operations.

19. The computer implemented method of claim 17, further comprising:
detecting a loss of communication with the device during an ongoing debug session;
suspending the debug session while the loss of communication continues;
when communication is re-established with the device, receiving next information from the device;
identifying from the received next information that the loss of communication was due to entry of the device into a low power mode;
determining whether the low power mode is a first type low power mode, where the first type low power mode is one of a plurality of different types of low power modes; and in response to the low power mode being a first type low power mode, initiating the transmitting to the device of the second command.

20. The computer implemented method of claim 17, further comprising:
in response to the debugger application receiving debug session data and state information after the device has exited from a low power mode, tagging the received data and state information as being associated with the exit from the low power mode, wherein the debugger application is able to identify which debug data corresponds to the device exiting the low power mode.

21. The computer implemented method of claim 17, wherein:
the first entry is an exit hold reset enable (EHRE) bit and the first command is a signal which sets the EHRE bit to a logic 1 value;
the second entry is an exit hold reset release (EHRR) bit and the second command is a signal which sets the EHRR bit to a logic 1 value; and
setting of the EHRR bit triggers the PMM to perform one or more functions from among: (a) when the PMM withholds power from the one or more core logic on exit from the low power mode until the EHRR bit is set to the logic 1 value, applying power to the one or more core logic to enable the core logic to resume processing operations of the device; and (b) when the PMM asserts a reset signal to the one or more core logic on exit of the device from the low power mode and continues to assert the reset signal until the EHRR bit is set to the logic 1 value, negating an assertion of the reset signal to enable the one or more core logic to resume processing operations of the device.

22. In a device configured with one or more core logic and one or more debug components to facilitate debug operations of the device, and one or more control and status (CS) registers, a method for enabling debugging of a low power mode entry and exit by the device, the method comprising:
in response to receiving an input to activate a return of the device from a low power mode in which power was removed from the core logic as well as the one or more debug components:
determining a type of low power mode from which the device is returning, where the type is one of a plurality of different types of low power modes; and
in response to the device returning from a first type low power mode in which the current debug states of the one or more debug components are lost, preventing one or more of the core logic from resuming processing operations until the one or more debug components have been re-configured to their respective debug states;
detecting an entry of the device into the low power mode;
in response to detecting the device's entry into the low power mode, automatically asserting a reset signal to the core logic;
continuing to assert the reset signal in response to the device returning from the first type low power mode;
receiving an input indicating an assertion of the reset signal is no longer required; and
in response to receiving the input indicating the assertion of the reset signal is no longer required, automatically negating the reset signal to enable the core logic to resume processing.

23. The method of claim 22, wherein the PMM comprises a power allocation mechanism for granularly applying power to the first set of components, separate and independent from applying power to the second set of components, and the method further comprises:
responsive to a return from a first type low power mode:
immediately applying power to the second set of components; and
delaying an application of power to the first set of components until receipt of the input indicating that the second set of components have been re-configured to their respective current debug states.

24. In a device configured with one or more core logic and one or more debug components to facilitate debug operations of the device, and one or more control and status (CS) registers, a method for enabling debugging of a low power mode entry and exit by the device, the method comprising:
in response to receiving an input to activate a return of the device from a low power mode in which power was removed from the core logic as well as the one or more debug components:
determining a type of low power mode from which the device is returning, where the type is one of a plurality of different types of low power modes; and
in response to the device returning from a first type low power mode in which the current debug states of the one or more debug components are lost, preventing one or more of the core logic from resuming processing operations until the one or more debug components have been re-configured to their respective debug states;
wherein the one or more CS registers comprises: a first entry that is settable to a first value, which indicates a debug of the device's entry and exit from a low power mode is to be performed; a second entry that is settable to a second value, which indicates to the PMM logic that the core logic can be allowed to resume processing operations; a third entry that is settable by the PMM logic to a third value, which indicates that the low power mode was a first type low power mode; and a fourth entry that is settable by the PMM logic to a fourth value, which indicates that the low power mode was a second type low power mode;
wherein the one or more CS registers are coupled to the PMM via one or more signal lines and the PMM comprises a latch; and
in response to detection of an entry by the device into the low power mode, latching into the latch a current value of a first entry of the CS register;
in response to a return of the device from the low power mode, checking a latched value saved within the latch;
in response to the latched value being a first value and the PMM preventing the core logic from processing by assertion of a reset signal:
withholding a negation of a reset signal to the core logic, wherein the negation of the reset signal is required to enable the core logic to enter into an operational state;
determining when a low power mode from which the device is exiting is a first type low power state that requires a restore of one or more debugs components to enable seamless resumption of debugging operations on the device to capture debug data covering the exit by the device from the low power mode; and in response to the low power mode being the first type low power mode, automatically setting a value of a third entry of the CS register to indicate that the low power mode was a first type low power mode to trigger a hold of a negation of the reset of the device; and detecting a current value of the second entry of the one or more CS registers; and responsive to the current value associated with the second entry being the second value, negating the reset signal to core logic;

wherein the withholding of the negation of the reset enables the external debugger to first restore the one or more debug components to the before the reset signal is negated by the PMM logic; and wherein each change to the first entry and the second entry of the CS register is received via a communication interface that enables communication by an external debugger with the device, wherein the external debugger is communicatively coupled to the second set of components and to one or more CS registers to enable the external debugger to: exchange debug information with the second set of components; set a value of one or more entries of the CS register; receive one or more values from one or more entries of the CS register; and restore state of the second set of components to the current debug state that existed prior to entry of the device into a first type low power mode.

25. The method of claim 24, further comprising:

detecting an entry of the device into the low power mode;

in response to detecting the device's entry into the low power mode, automatically asserting a reset signal to the core logic;

continuing to assert the reset signal in response to the device returning from the first type low power mode;

receiving an input indicating an assertion of the reset signal is no longer required; and in response to receiving the input indicating the assertion of the reset signal is no longer required, automatically negating the reset signal to enable the core logic to resume processing.

\* \* \* \* \*